May 27, 1958  E. GAUGER  2,836,157
FORCED FLOW VAPOR GENERATOR WITH MULTIPLE
VAPOR AND LIQUID SEPARATORS
Filed Aug. 3, 1954  2 Sheets-Sheet 1
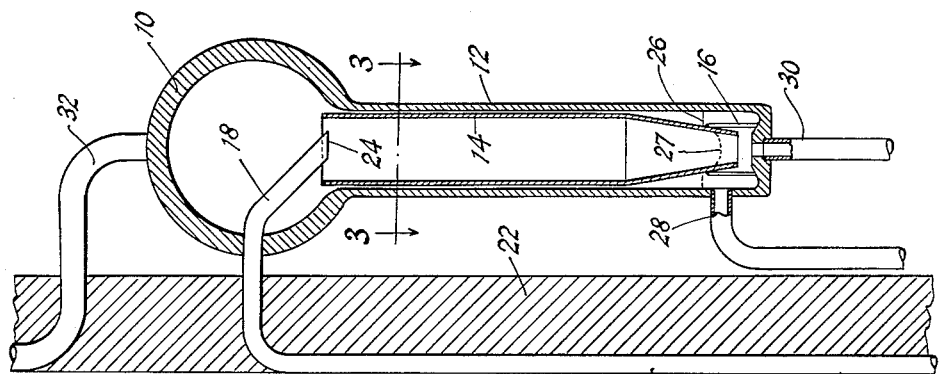
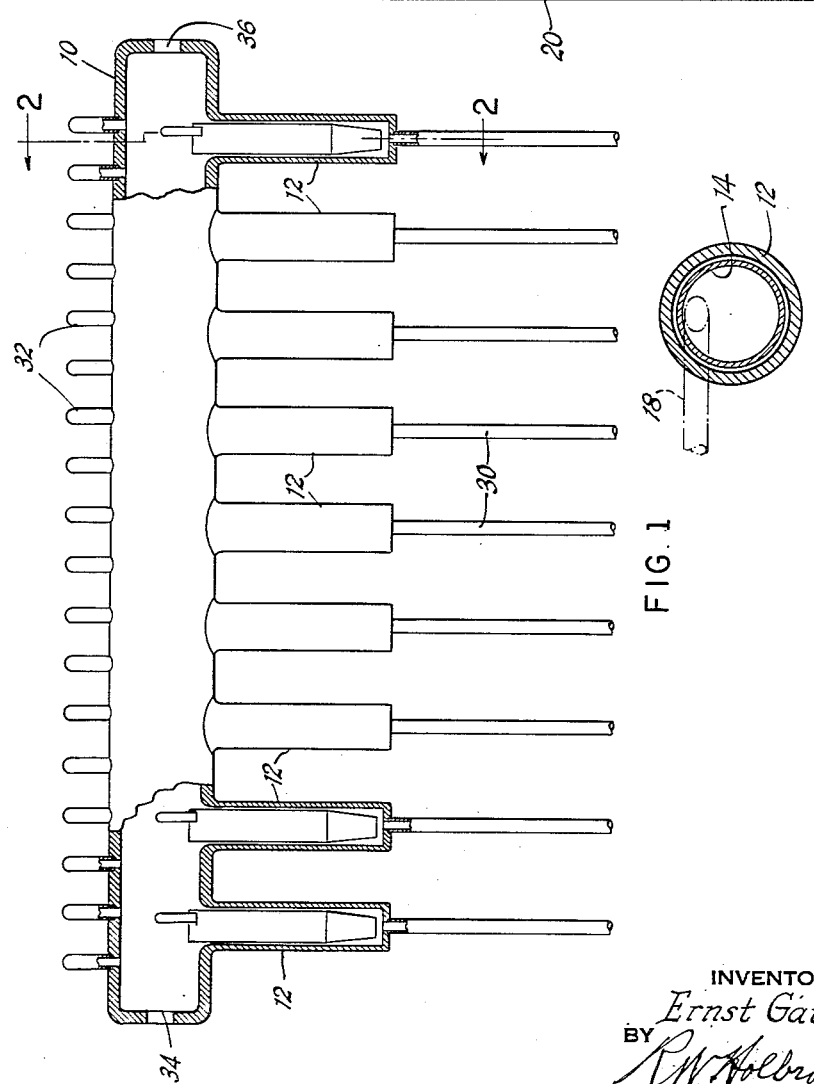
INVENTOR
*Ernst Gauger*
BY
*R. W. Holbrook*
ATTORNEY

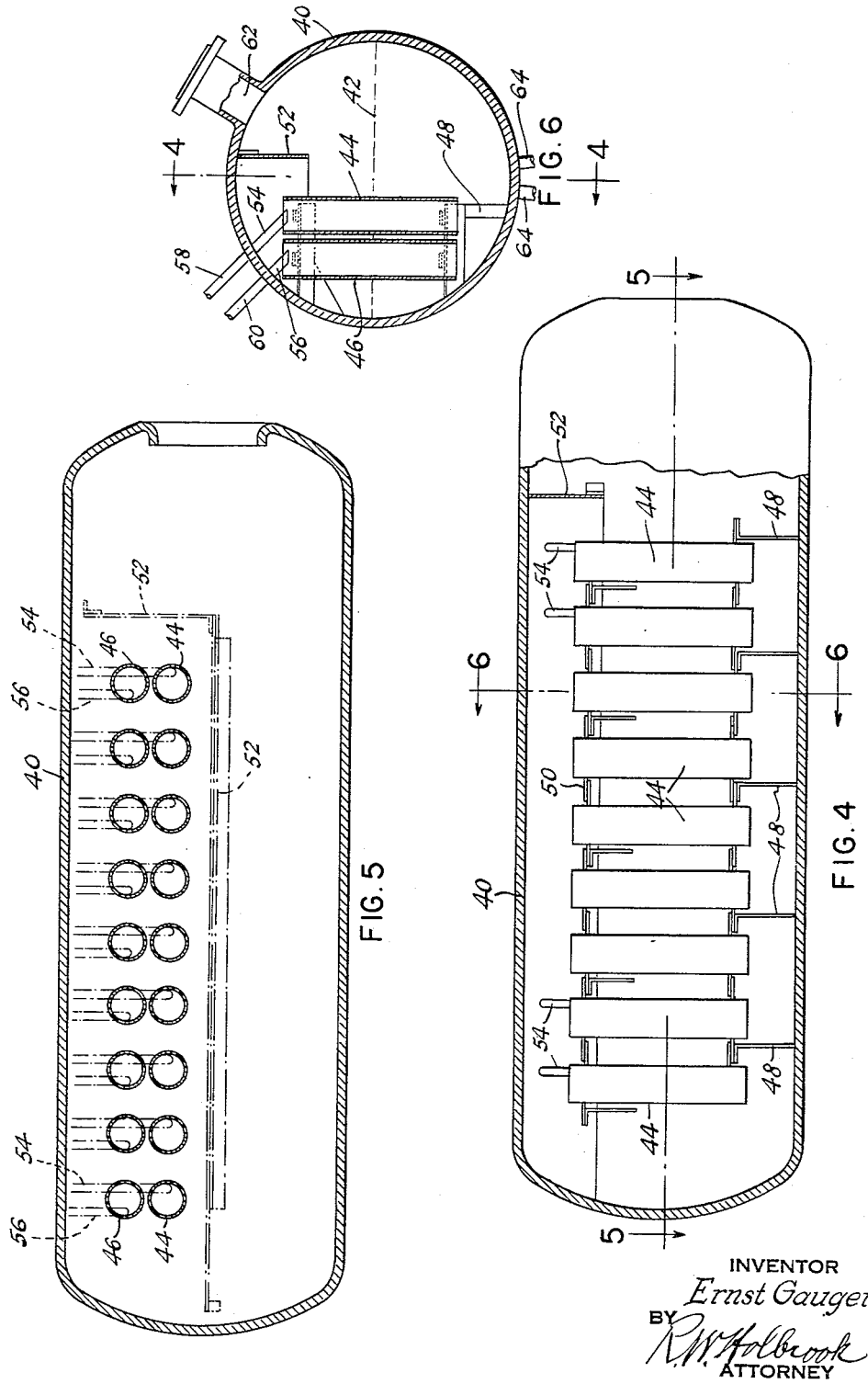

United States Patent Office 2,836,157
Patented May 27, 1958

2,836,157

FORCED FLOW VAPOR GENERATOR WITH MULTIPLE VAPOR AND LIQUID SEPARATORS

Ernst Gauger, Oberhausen, Germany, assignor to The Babcock & Wilcox Company, New York, N. Y., a corporation of New Jersey Application August 3, 1954, Serial No. 447,530

8 Claims. (Cl. 122—491)

This invention relates to improvements in high pressure vapor generating and superheating units, and more particularly, to improvements in means for separating the vapor from the liquid in vapor and liquid mixtures discharged into a pressure vessel of such a unit.

In one of its aspects, the invention involves a pressure vessel, preferably in the form of a vapor and liquid drum to which high velocity mixtures of vapor and liquid are delivered by vapor generating tubes subject to the heat of a furnace and/or the furnace gases of the vapor generating unit. Within the pressure vessel, or vapor and liquid drum, there are disposed a plurality of whirl chamber elements in the form of plain and unobstructed hollow right cylindrical members. These whirl chamber elements are open to the vapor space at the upper part of the drum and their lower ends are fully open to the liquid space at the lower part of the drum. The whirl chamber elements or hollow cylinders are fixed in upright position. They have smooth and unobstructed interiors. Extending downwardly and preferably at an incline of about 45° into the open top of each whirl chamber element is a nozzle or tubular member continuing the flow of a high velocity vapor and liquid mixture from a vapor generating tube communicating with an opening in the drum. Each nozzle is preferably somewhat tangentially arranged with respect to its whirl chamber member in order that the nozzle efflux will set up a whirling movement of the vapor and liquid within the circular whirl chamber element, to cause centrifugal separation of the vapor and liquid, with the separated vapor, because of its lighter density, being accumulated centrally of the whirl chamber elements so that it may rise to the vapor space of the drum above the whirl chambers. The downward inclination of the nozzle is such that any excessive flattening out or push-up of the entering stream toward the top of the whirl chamber element is prevented. In other words, the structure and arrangement is such as to prevent or minimize spill over of liquid from the top of the whirl chamber. This downward inclination is also such that the first convolution (or helical turn) of the entering fluid has such a downward direction or downward component that it does not substantially collide with or interfere with the next successive convolution or turn. This feature of the invention promotes effective vapor and liquid separation and at the same time minimizes pressure drop through the vapor generating unit. The entering velocity of the mixture stream together with the downward component thereof causes the heavier fluid, i. e., water, to accumulate toward the outer part of the flow area of the whirl chamber element and to move with an effective velocity head toward the lower open end of the whirl chamber element, this velocity head promoting an increase in the whirl chamber separating space within the whirl chamber element. This increase in the vapor separating space within each element is such that the mean level of the separated liquid within the whirl chamber element is at an elevation lower than the elevation of the water level in the drum externally of the whirl chamber elements.

In another aspect of the invention, it involves a forced flow vapor generating and superheating unit in which vapor generating tubes exposed to the heat of a heating medium communicate with a pressure vessel in the form of a header disposed externally of the heating zone. This header preferably has a plurality of depending tubular extensions for separate or individual vapor and liquid separators. Within each one of these depending tubular extensions of the header there is disposed a plain and unobstructed whirl chamber element in the form of a sleeve or hollow right cylinder preferably concentrically arranged with reference to its associated tubular extension and open at its top to the main space of the header which forms a vapor space common to all of the separators. The whirl chamber elements or sleeves within the separate pendent tubular extensions of the header are spaced radially inwardly of the tubular extensions so as to form an annular space in which liquid may flow from the header down to the liquid space at the bottom of each tubular extension. The lower part or lower end of the whirl chamber element or sleeve is preferably spaced upwardly from the bottom of its associated tubular header extension to provide an adequate exit opening for separated liquid from the bottom of the whirl chamber element. The separated liquid is drained from the lower end of each tubular extension and the separated vapor flows from the common vapor space of the header through a plurality of tubular circuits which may be exposed to the heat of the heating gas chamber to form a vapor superheater.

In the aspect of the invention referred to in the immediately preceding paragraph the high velocity flow of the vapor and liquid mixture downwardly and into the top of each whirl chamber element or sleeve takes place in the same manner as that previously referred to, and preferably at a downward incline of the order of 45° to effect the optimum vapor and liquid separation within the whirl chamber elements, with a minimum pressure drop imposed upon the unit.

In the application of the invention to a forced flow vapor generating unit as referred to in the preceding paragraphs the separate liquid heating and flow circuits are maintained quite independently, with respect to liquid flow, and this permits a washing, or rinsing or cleaning of any one flow circuit without substantially affecting the conditions within the other flow circuits. Also, the characteristic downward direction of the entering streams of liquid and vapor mixtures into the whirl chamber elements substantially eliminates excessive upwardly directed flow components of the efflux from the nozzles constituting the mixing inlets of the pertinent cyclone separators.

The invention, as above outlined, is characterized by whirl chambers which are formed by one piece unobstructed hollow cylinders of uniform circular cross section, thus promoting low pressure drop through the vapor and liquid separators, and hence through the vapor generating and superheating unit. This characteristic also promotes a substantial reduction in both labor and material costs of effective vapor and liquid separating apparatus for high pressure vapor generating units. Because of the one piece construction of the whirl chamber elements the welding of component parts to constitute whirl chamber elements is substantially eliminated, and the gauge of the metal employed for the whirl chamber elements of this invention is much less than the gauge of metal which has been necessary in prior art multiple-part whirl chamber elements.

The invention is concisely set forth in the appended claims, but, for a complete understanding of the invention, its advantages and uses, recourse should be had to the following description which refers to the accompanying drawings in which preferred embodiments of the invention are illustrated.

In the drawings:

Fig. 1 is mainly an elevation of a vapor and liquid separator constituting a part of a forced flow vapor generating and superheating unit, the separator being broken away at its ends to show the construction of the component centrifugal liquid and vapor separators;

Fig. 2 is mainly a vertical section of one of the centrifugal vapor and liquid separators, on an enlarged scale, this view also indicating the relationship of the separator and its connected tubes to the wall of a heating chamber in which the tubes are exposed to heat;

Fig. 3 is a transverse horizontal section on the line 3—3 of Fig. 2;

Fig. 4 is mainly a vertical section through a vapor and liquid drum, on the line 4—4 of Fig. 6, showing the arrangement, in elevation, of a series of the upright hollow cylinder whirl chamber vapor and liquid separators;

Fig. 5 is a plan section of the vapor and liquid drum of Fig. 4, taken on the line 5—5 of Fig. 4; and Fig. 6 is a vertical transverse section of the Fig. 4 vapor and liquid drum, taken on the section line 6—6 of Fig. 4.

In the drawings, Figs. 1, 2 and 3 indicate a horizontally positioned pressure vessel, the main part of which is in the form of a header 10. The remainder of the pressure vessel takes the form of a plurality of depending tubular extensions 12, each providing for a separate vapor and liquid separator. Arranged preferably concentrically within each tubular extension 12 and spaced radially inwardly from the tubular extension is a tubular whirl chamber element 14. This element is open at its top to the interior of the header 10 which forms a separated vapor chamber common to all of the vapor and liquid separators in the tubular extensions 12. Each element 14 is open at its lower end to the lower part of the associated tubular extension 12 and is preferably supported from the bottom of that extension by uprights 16 arranged 120° apart circumferentially.

The vapor and liquid separator of Figs. 1 to 3, as a part of a forced flow vapor generating and superheating unit, has the nozzles, or discharge end portions 18 of vapor generating tubes extending downwardly and disposed substantially tangentially into the open tops of the whirl chamber elements 14. Each of these nozzles continues the forced flow through a vapor generating tube 20 which is disposed on the heated side of a wall 22 of a heating chamber. The nozzle 18 may be separate from the main part of the tube 20 which preferably has its upper end expanded into pressure tight connection with the header 10. It is expanded into a tube seat in the header. In that case the nozzle 18 may be welded in the position shown, to the wall of the header 10 in order that it may continue the flow of the associated vapor generating tube. Each nozzle and its associated vapor generating tube normally conduct a high velocity stream of a mixture of vapor and liquid. The nozzle extends downwardly at an incline of preferably 45° into the top of its associated whirl chamber separator element 14. It is preferably also directed so that it initiates a whirling movement of the incoming fluid within the whirl chamber element and this direction may be spoken of as a substantially tangential direction. Preferably, for optimum separating results, the velocity of the mixture flowing into the top of the whirl chamber element should be of the order of 20 meters per second, at maximum vapor generating load. The downward inclination of the nozzle and the disposition of the horizontally cut off lower end 24 of the nozzle are such as to substantially eliminate any upwardly directed flow component of the incoming stream, whereby there would occur any substantial spill-over of the incoming fluid over the top of the element 14. However, if the spill-over does at any time occur, the liquid of the spill-over will move downwardly in the annular space between the element 14 and the tubular extension 12 to the water space at the bottom of the extension 12. The inclination and entry disposition of the nozzle 18 with respect to the top of the whirl chamber element 14 is also such that the continued circular movement of the stream beyond the first complete 360° turn of the stream within the element 14 does not collide with the first 360° turn.

The action within each of the whirl chamber elements 14 is such that the liquid, being the heavier component of the mixture is thrown toward the walls of the element 14 while it moves downwardly within that element with a downward velocity component sufficient to expel the separated water from the element 14 against the static head developed from a higher water level 26 in the annular space between the element 14 and the extension 12, and a lower water level 27 within the element 14. The separated liquid passes from the lower part of the tubular extension 12 laterally through a tube 28, and the lower part of each of the tubular extensions 12 may be periodically drained through a tubular connection 30. The separated vapor accumulates centrally of each of the separator elements 14 and rises into the main vapor chamber of the header 10 which is common to all of the vapor and liquid separators. The separated vapor passes from the top of the header 10 through a row of tubes 32 then through the wall 22. The tubes 32 may continue along the heated side of the wall 22 where they are exposed to high temperature heating mediums so that they constitute a vapor superheater.

Inasmuch as the described liquid and vapor separator is intended as a part of a vapor generating and superheating unit operating at pressures which may be higher than 2000 p. s. i., access openings 34 and 36 in the opposite ends of the header 10 are normally closed by pressure tight closures adapted to withstand the pertinent pressure.

Figs. 4, 5 and 6 disclose a vapor and liquid separator drum 40 normally having a liquid level such as that indicated at 42 therein. Disposed within the drum and laterally of its centerline there is a front row 44 and a rear row 46 of tubular whirl chamber elements preferably in the form of right hollow cylinders, unobstructed from end to end. They are preferably of uniform circular section from end to end. These whirl chamber elements are secured in their upright positions by lower supports 48 and upper supports 50 which hold them in their spaced operative positions within the drum. The upper ends of these whirl chamber elements are shown as disposed within the space defined by a downwardly open baffle or compartment 52 secured to the upper part of the drum.

Extending downwardly into the open upper end of each one of the whirl chamber elements 44 there is a nozzle 54 preferably arranged as to inclination and direction, in the manner described with reference to the description of the separator of Figs. 1 to 3. Similar nozzles 56 extend into the open upper ends of the whirl chamber elements 46 of the rear row. The nozzles 54 continue the separate flows of vapor and liquid mixtures proceeding through the circulators or vapor generating tubes 58, and the nozzles 56, similarly, continue the similar flows through the tubes 60.

The centrifugal separating action within the whirl chamber elements 44 and 46 is similar to that already described with reference to the Figs. 1 and 2 separator, the downward velocity head of the separated water being such as to maintain a mean separated liquid level within the whirl chambers 44 and 46 which may be substantially below the drum water level 42 externally of the whirl chambers. Separated vapor from the drum vapor space above the water level 42 may pass through the vapor offtake 62 to a superheater and thence to a point of use.

In Fig. 3 the nozzle 18 is so indicated that its longitudinal axis is parallel to a tangent to the hollow cylindrical whirl chamber 14, and Fig. 5 shows the same relationship of the nozzles 54 and 56 relative to their respective whirl chamber separator elements 44 and 46. This clearly makes each nozzle tangentially arranged with respect to some circle which is concentric with its associated whirl chamber separator element, but of smaller radius.

The vapor and liquid separating apparatus of Figs. 4, 5 and 6 is intended as part of a vapor generating and superheating unit in which there are vapor generating tubes exposed to the heat of a furnace and the heating gases originating therein, or to another heating medium. Such a vapor generating and superheating unit may also involve a circulating system in which the separated liquid passes from the liquid space of the drum 40 downwardly through tubular downcomers 64 connected with that space. The separated liquid flowing through these downcomers passes to the inlet ends of the vapor generating tubes which are exposed to heat, and the outlet ends of the downcomers may be connected by appropriate headers and circulators to the inlet ends of the vapor generating tubes. In many instances such vapor generating tubes will be mainly the furnace wall tubes of the vapor generating and superheating unit.

A vapor generating unit and superheating unit including the pertinent vapor and liquid separating apparatus is characterized by low pressure drop because of the character of the whirl chamber elements. Advantageous low pressure drop is promoted by the fact that these elements are smooth interiorly, and unobstructed from end to end. It is also promoted by the fact that they are open at their tops and freely open at their lower ends to the liquid space of the pressure vessel. These characteristics also promote a substantial reduction in original cost of materials and cost of the original installation not only because of the simplicity of the tubular whirl chamber elements but also because they may be one piece plain tubular elements requiring no welding together of numerous components, as has been involved in prior art devices of similar nature. Because of the many components of whirl chambers of the prior art it has been necessary to use metal of a gauge much greater than the gauge of the metal required for the tubular whirl chamber elements of this invention. Such welding together of numerous components of the prior art whirl chambers has also involved substantial labor or fabrication costs which are eliminated by this invention.

The entire arrangement of the pertinent whirl chambers and their entrance nozzles relative to the drum in which they are disposed, also promotes economical cost of the overall drum internals, and because of its simplicity promotes substantially reduced original installation and maintenance costs.

Whereas the invention has been described with particular reference to preferred embodiments thereof shown in the drawings, it is to be appreciated that the invention is not limited to all of the details thereof. It is rather to be considered of a scope corresponding to the scope of the subjoined claims.

What is claimed is:

1. In a vapor and liquid separating unit, a pressure vessel normally having therein a liquid level between its liquid space and its vapor space, an upright unobstructed separator element mainly in the form of a hollow cylindrical shell of uniform circular horizontal cross section throughout at least the major portion of its height, said element being disposed within the pressure vessel and open throughout its top to the vapor space of the pressure vessel and open at its bottom to the liquid space of the pressure vessel, a separate inlet tube having a downwardly inclined discharge end portion arranged to discharge substantially tangentially and downwardly into the open top of the separator element and normally conducting a high velocity vapor and liquid mixture stream into the separator element, vapor offtake means leading from the vapor space of the vessel and separated liquid offtake means leading from the liquid space of the pressure vessel, the longitudinal axis of the inlet tube being substantially tangential to a circle concentric with the shell but of smaller diameter than said shell.

2. In a forced flow high pressure vapor generator, a heating chamber, a pressure vessel disposed externally of said chamber and having a plurality of depending tubular extensions along one side thereof for separate liquid and vapor separators, the pressure vessel space above the extensions constituting a main separated vapor chamber common to said extensions, a tubular whirl chamber element disposed within each extension and radially spaced therefrom, said element being open at its top to the main chamber and having an open lower end at the lower part of the associated tubular extension, forced flow vapor generating tubes subject to the heat of said heating chamber and normally having a high velocity fluid flow therein, a plurality of vapor and liquid mixture inlet nozzles each continuing the flow from one of the vapor generating tubes and having its discharge end portion directed downwardly at an incline into the top of a whirl chamber element and directed substantially tangentially thereof, separated vapor offtake tubes leading from said main chamber, and separated liquid offtake pipes each leading from the lower part of one of said tubular extensions.

3. In a vapor and liquid separator for a forced flow high pressure vapor generator, a pressure vessel in the form of a header having a plurality of depending tubular extensions along one side thereof for separate vapor and liquid separators, the header space above the extensions constituting a main separated vapor chamber common to the separators, a tubular whirl chamber element of circular cross section concentrically disposed within each extension and radially spaced therefrom, said element being open at its top to the main chamber and having an open lower end, a plurality of vapor and liquid mixture inlet nozzles each extending downwardly at an incline into the top of a whirl chamber element and directed substantially tangentially thereof, each nozzle normally conducting a high velocity vapor and liquid mixture into its whirl chamber element, separated vapor offtake means leading from said main chamber, and separated liquid offtake pipes each leading from the lower part of one of said tubular extensions.

4. In a forced flow high pressure vapor generator, means forming a heating zone, a pressure vessel disposed externally of said chamber and having a plurality of depending tubular extensions along one side thereof for separate liquid and vapor separators, the pressure vessel spaced above the extensions constituting a main separated vapor chamber common to the separators, a one piece tubular whirl chamber element of circular cross section concentrically disposed within each extension and radially spaced therefrom, said element being open at its top to the main chamber and having an open lower end at the lower part of its associated tubular extension, forced flow vapor generating tubes subject to the heat of said heating zone, a plurality of vapor and liquid mixture inlet nozzles each continuing the flow from one of the vapor generating tubes and having its discharge end portion directed downwardly at an incline of the order of 45° into the top of a whirl chamber element and directed substantially tangentially thereof, separated vapor offtake tubes leading from said main chamber and then into the heating gas chamber to form a vapor superheater, and separated liquid offtake pipes each leading from the lower part of one of said tubuar extensions.

5. In a forced flow high pressure vapor generator, a pressure vessel in the form of a header having a plurality of depending tubular extensions along one side thereof for separate liquid and vapor separators, the header space above the extensions constituting a main separated vapor chamber common to the separators, a tubular whirl chamber element of circular cross section concentrically disposed within each depending tubular extension and radially spaced therefrom, said element being open at its top to the main chamber and having an open lower end at the lower part of the associated tubular extension, each of said whirl chamber elements being unobstructed from end to end, forced flow vapor generating tubes, a plurality of vapor and liquid mixture inlet nozzles each continuing the flow from one of the vapor generating tubes and having its discharge end portion directed downwardly at an incline into the top of a whirl chamber element and directed substantially tangentially thereof, separated vapor offtake tubes leading from said main chamber, and separated liquid offtake pipes each leading from the lower part of one of said tubular extensions.

6. In a vapor and liquid separating unit as claimed in claim 1, in which the inlet tube downwardly inclined discharge portion terminates in a horizontally cut-off end at an elevation below the elevation of the top of the separating element.

7. In a vapor and liquid separating unit as claimed in claim 1, in which the cylindrical shell is unobstructed from end to end and has a smooth interior wall surface.

8. In a vapor and liquid separating unit as claimed in claim 1, in which the cylindrical shell is of uniform circular horizontal cross-section throughout its height and in a partly submerged position in the pressure vessel.

References Cited in the file of this patent

UNITED STATES PATENTS

| | | |
|---|---|---|
| 446,053 | Bittinger | Feb. 10, 1891 |
| 476,524 | Day | June 7, 1892 |
| 537,451 | Hawley | Apr. 16, 1895 |
| 1,402,784 | Moore | Jan. 10, 1922 |
| 2,191,671 | Kuhner | Feb. 27, 1940 |
| 2,402,154 | Fletcher | June 18, 1946 |
| 2,587,761 | Pyle | Mar. 4, 1952 |
| 2,592,530 | Artsay | Apr. 15, 1952 |

FOREIGN PATENTS

| | | |
|---|---|---|
| 902,447 | France | Dec. 4, 1944 |